United States Patent
Murai

[19]

[11] Patent Number: 6,081,311
[45] Date of Patent: *Jun. 27, 2000

[54] LIQUID CRYSTAL DISPLAY APPARATUS HAVING HIGH WIDE VISUAL ANGLE AND HIGH CONTRAST

[75] Inventor: Hideya Murai, Tokyo, Japan

[73] Assignee: NEC Corporation, Tokyo, Japan

[ * ] Notice: This patent is subject to a terminal disclaimer.

[21] Appl. No.: 08/855,992

[22] Filed: May 14, 1997

[30] Foreign Application Priority Data

May 15, 1996 [JP] Japan .................................. 8-120085

[51] Int. Cl.$^7$ .................... G02F 1/1337; G02F 1/1335
[52] U.S. Cl. ................. 349/118; 349/119; 349/128; 349/136; 349/191
[58] Field of Search ................... 349/118, 119, 349/120, 129, 128, 136, 191

[56] References Cited

U.S. PATENT DOCUMENTS

| | | | |
|---|---|---|---|
| 5,757,455 | 5/1998 | Sugiyama et al. | 349/129 |
| 5,796,456 | 8/1998 | Takatori et al. | 349/129 |

FOREIGN PATENT DOCUMENTS

| | | |
|---|---|---|
| 0610924 | 8/1994 | European Pat. Off. . |
| 0631172 | 12/1994 | European Pat. Off. . |
| 0768560 | 4/1997 | European Pat. Off. . |
| 63-106624 | 5/1988 | Japan . |
| 2-306217 | 12/1990 | Japan . |
| 4-153621 | 5/1992 | Japan . |
| 7-120746 | 5/1995 | Japan . |
| 7-253578 | 10/1995 | Japan . |
| 9610775 | 4/1996 | WIPO . |

OTHER PUBLICATIONS

Ohashi M et al: "Viewing angle improvements of full–color TFT–LCDs" Fujitsu–Scientific and Technical Jornal, vol. 30, No. 2, Dec. 1994, pp. 154–161.

Chen J et al: "Simple four–domain twisted nematic liquid crystal display" Applied Physics Letters, vol. 67, No. 14, Oct. 2, 1995, pp. 1990–1992.

Patent Abstracts of Japan vol. 095 No. 008, Sep. 29, 1995 & JP 07 120745 A (Matsushita Electric Ind Co Ltd), May 12, 1995.

*Primary Examiner*—William L. Sikes
*Assistant Examiner*—Tai V. Duong
*Attorney, Agent, or Firm*—Sughrue, Mion, Zinn, Macpeak & Seas, PLLC

[57] ABSTRACT

A liquid crystal display apparatus includes a polarization plate, a twisted-mode type liquid crystal layer having coexistent regions with different twisted directions of liquid crystal orientations and different tilt angles of liquid crystal molecules within one pixel, and a compensation layer, having biaxial refractive anisotropy, interposed between the polarization plate and the liquid crystal layer.

12 Claims, 13 Drawing Sheets

$n_x > n_y > n_z$

LIQUID CRYSTAL DISPLAY APPARATUS HAVING HIGH WIDE VISUAL ANGLE AND HIGH CONTRAST

BACKGROUND OF THE INVENTION

Field of the Invention

The present invention relates to a twisted nematic (TN)-mode liquid crystal display (LCD) apparatus having a liquid crystal layer with coexistent regions within one pixel and a compensation layer, capable of operating excellently in terms of visual angle and contrast.

A first prior art TN-mode LCD apparatus includes two electrodes with first and second oriented layers coated thereon and a twisted-mode type liquid crystal layer sandwiched by the electrodes. In this case, a micro-rubbing technique is introduced in a plurality of regions of one pixel. For example, a rubbing direction in one region of the first oriented layer is opposite to a rubbing direction in another region of the first oriented layer. Also, a rubbing direction in one region of the second oriented layer is opposite to a rubbing direction in another region of the second oriented layer. As a result, the orientation of liquid crystal molecules in one region of the liquid crystal layer is different from the orientation of liquid crystal molecules in another region of the liquid crystal layer, so that one pixel is divided into a plurality of sub-pixels, thus improving the visual angle characteristics as a whole (see JP-A-63-106624). This will be explained later in detail.

In the first prior art apparatus, however, since each pixel is divided into sub-pixels with different twisted directions of liquid crystal orientation and different directions of tilt angles of liquid crystal molecules, light transmittance at an inclined visual angle is not reduced, so that a so-called "floating white" phenomenon occurs when a voltage is applied to show "black" in one pixel. Thus, a high contrast cannot be obtained at a wide visual angle.

In a second prior art TN-mode LCD apparatus, rubbing directions of first and second oriented layers are uniform within one pixel, so that one pixel is not divided into a plurality of sub-pixels. That is, the rubbing direction of the first oriented layer is orthogonal to the rubbing direction of the second oriented layer, so that a twisted angle of liquid crystal orientation is 90°. Instead of this, a biaxial phase difference compensation layer is provided between a polarization plate and a transparent substrate. Thus, the refractive anisotropic characteristics to inclined incident light are regulated to realize wide visual angle characteristics. Particularly, optical characteristics of liquid crystal molecules that are rising as a voltage is applied can be improved (see JP-A-7-120746). This will also be explained later in detail.

In the second prior art apparatus, however, since the direction of tilt angles of liquid crystal molecules differs from minute region to minute region, a satisfactory effect cannot be expected.

SUMMARY OF THE INVENTION

It is an object of the present invention to provide an LCD apparatus having a wide visual angle and a high contrast.

According to the present invention, a liquid crystal display apparatus includes a polarization plate, a twisted-mode type liquid crystal layer having coexistent regions with different twisted directions of liquid crystal orientations and different tilt angles of liquid crystal molecules within one pixel, and a compensation layer having biaxial refractive anisotropy interposed between the polarization plate and the liquid crystal layer.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, a prior art LCD apparatus will be explained with reference to FIGS. 1, 2 and 3.

Figure 1:
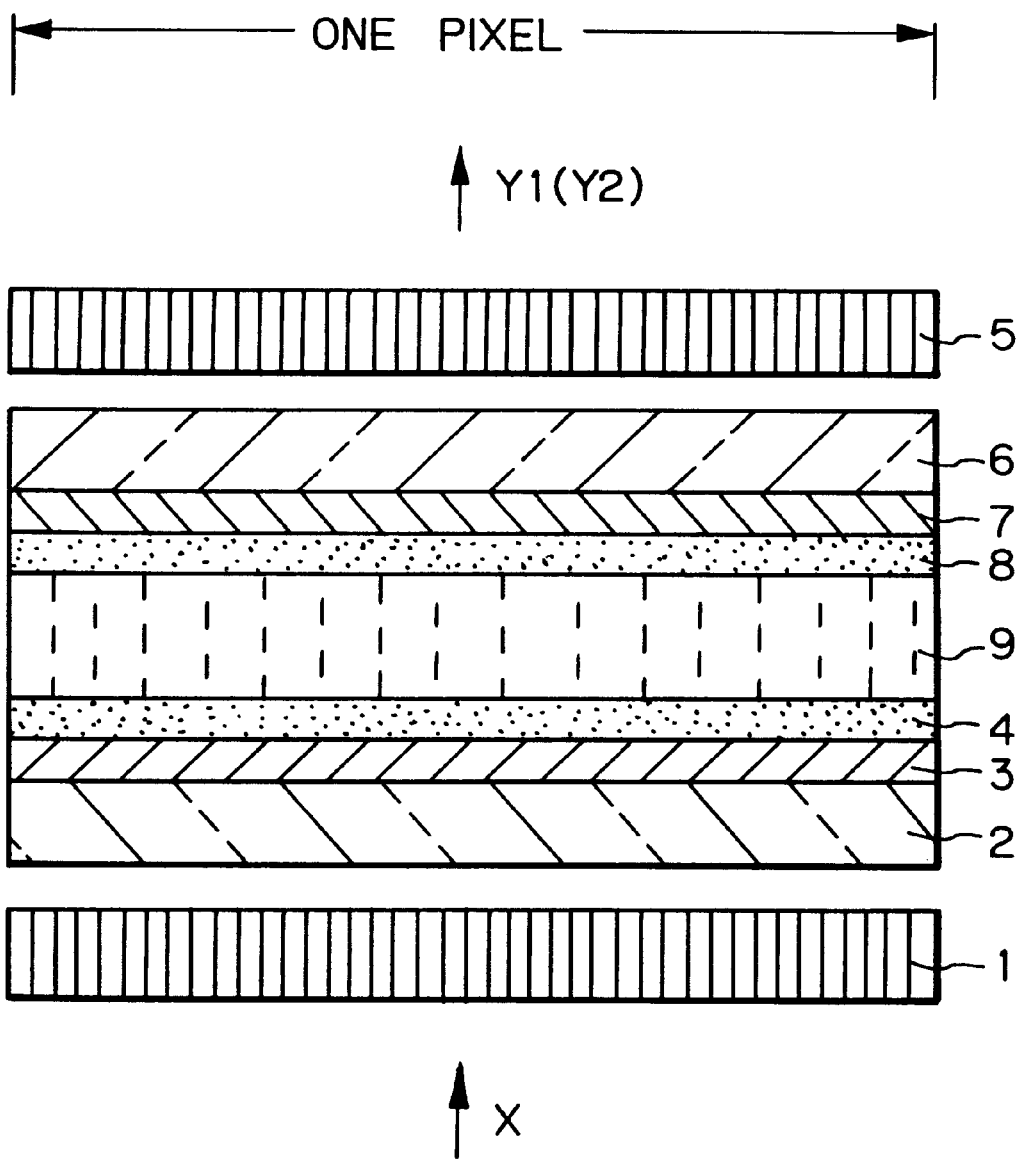
FIG. 1 is a cross-sectional view illustrating a first prior art transmission-type TN-mode LCD apparatus.

In FIG. 1, which is a cross-sectional view illustrating a first prior art transmission-type TN-mode LCD apparatus, reference numeral 1 designates a polarization plate for passing the frequency component of an incoming light X in a specified direction. Also, reference numeral 2 designates a transparent substrate on which a transparent electrode 3 made of indium tin oxide (ITO) is coated. Further, an oriented layer 4 is formed on the transparent electrode 3. Similarly, reference numeral 5 designates a polarization plate for passing an outgoing light having a frequency component in a specified direction. Also, reference numeral 6 designates a transparent substrate on which a transparent electrode 7 made of ITO is coated. Further, an oriented layer 8 is formed on the transparent electrode 7. In addition, a liquid crystal layer 9 is provided between the transparent electrodes 3 and 7. In this case, the orientation of liquid crystal molecules in the liquid crystal layer 9 is twisted.

The operation of the apparatus of FIG. 1 is explained below.

First, assume that no voltage is applied between the transparent electrodes 3 and 7. The incident light X as well as natural light is converted by the polarization plate 1 into a linearly polarized light. Then, this light penetrates the transparent substrate 2 and the transparent electrode 3, and is incident to the liquid crystal layer 9. In the liquid crystal layer 9, while the plane of polarization of the incident light is changed by the double refraction characteristics of the liquid crystal layer 9, the light reaches the transparent electrode 7. Then, the light penetrates the transparent electrode 6 and the transparent substrate 5. As a result, only the frequency component of light in the specified direction passes through the polarization plate 5, thus obtaining an outgoing light Y1.

Next, assume that a voltage is applied between the transparent electrodes 3 and 7. In this case, the orientation of the liquid crystal molecules in the liquid crystal layer 9 is changed due to the anistropic dielectric characteristics thereof in accordance with the electric field between the transparent electrodes 3 and 7. As a result, the plane of polarization of the light which has reached the transparent electrode 7 is different from that where no voltage is applied between the transparent electrodes 3 and 7. As a result, an outgoing light Y2 different from the outgoing light Y1 is obtained.

Figure 2:
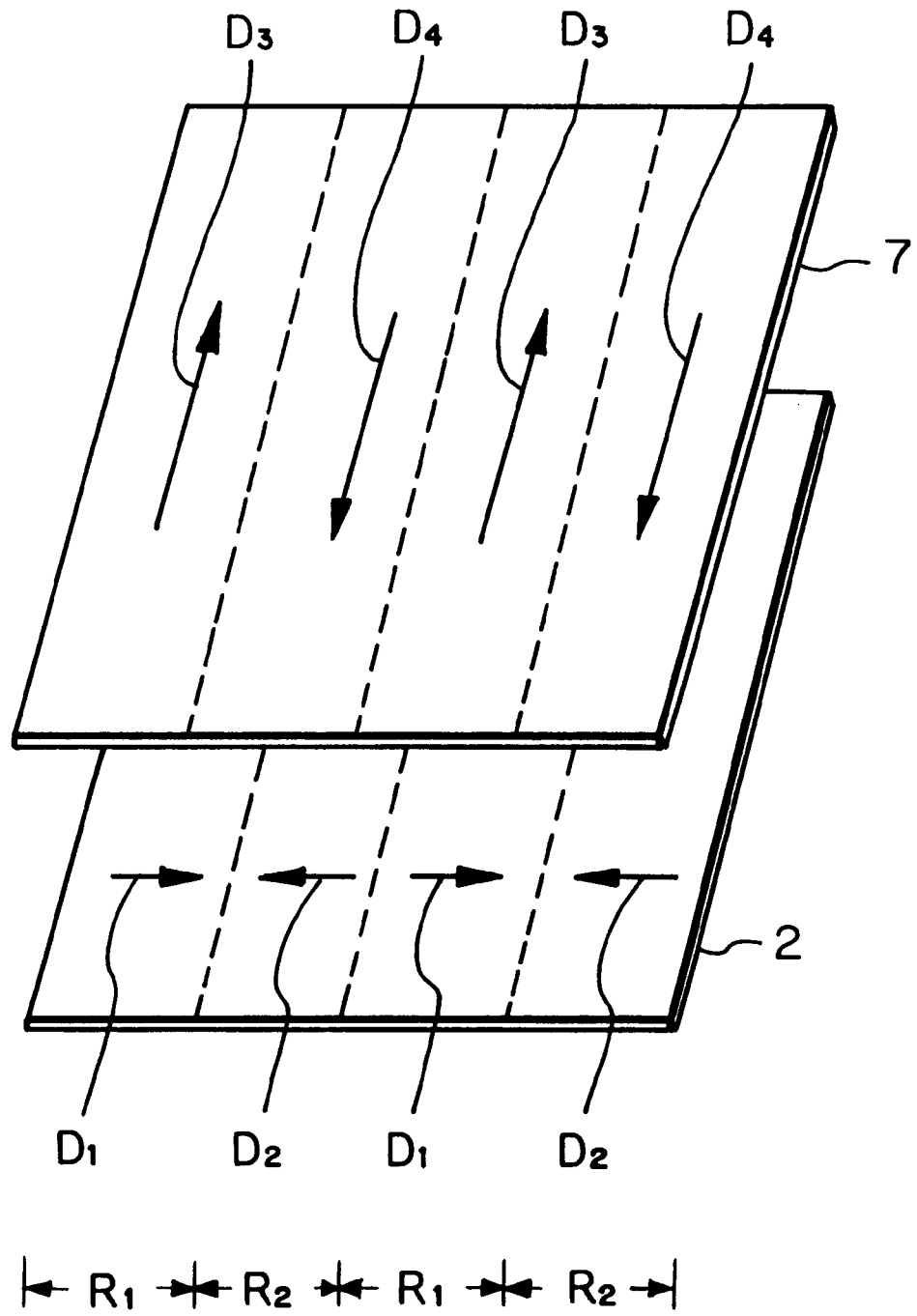
FIG. 2 is a perspective view of the transparent substrates for explaining the rubbing directions of FIG. 1.

As illustrated in FIG. 2, which shows the rubbing direction of the oriented layers 4 and 8 on the transparent electrodes 2 and 7, a micro-rubbing technique is introduced in each of regions $R_1$ and $R_2$ of one pixel. That is, a rubbing direction $D_1$ in the region $R_1$ of the oriented layer 4 is opposite to a rubbing direction $D_2$ in the region $R_2$ of the oriented layer 4. Also, a rubbing direction $D_3$ in the region $R_1$ of the oriented layer 8 is opposite to a rubbing direction $D_4$ in the region $R_2$ of the oriented layer 8. As a result, the orientation of liquid crystal molecules in the region $R_1$ is different from the orientation of liquid crystal molecules in the region $R_2$, so that one pixel is divided into a plurality of sub-pixels, thus improving the visual angle characteristics as a whole (see JP-A-63-106624).

In the apparatus of FIGS. 1 and 2, however, since each pixel is divided into sub-pixels with different twisted directions of liquid crystal orientation and different directions of tilt angles of liquid crystal molecules, light transmittance at an inclined visual angle is not reduced, so that a so-called "floating white" phenomenon occurs when a voltage is applied to show "black" in one pixel. Thus, a high contrast cannot be obtained at a large visual angle.

Figure 3:
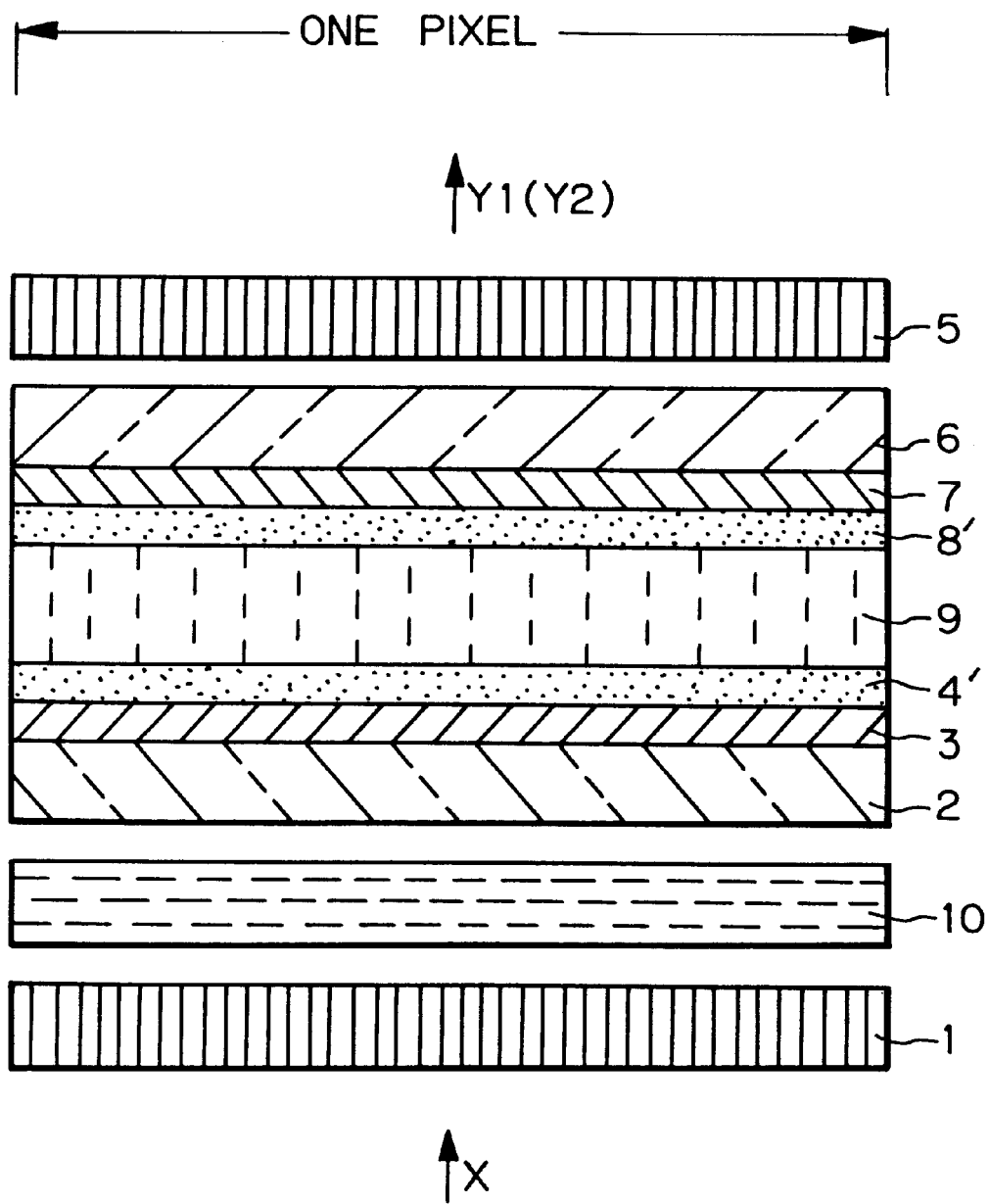
FIG. 3 is a cross-sectional view illustrating a second prior art transmission-type TN-mode LCD apparatus.

In FIG. 3, which illustrates a second prior art transmission-type TN-mode LCD apparatus, rubbing directions of oriented layers 4' and 8' are uniform within one pixel, so that one pixel is not divided into a plurality of sub-pixels. That is, the rubbing direction of the oriented layer 4' is orthogonal to the rubbing direction of the oriented layer 8', so that a twisted angle of liquid crystal orientation is 90°. Instead of this, a biaxial phase difference compensation layer 10 is provided between the polarization plate 1 and the transparent substrate 2. Thus, the refractive anisotropic characteristics in relation to inclined incident light are regulated to realize wide visual angle characteristics. Particularly, optical characteristics of liquid crystal molecules that are rising as a voltage is applied can be improved (see JP-A-7-120746).

In the apparatus of FIG. 3, however, if a plurality of regions having different directions of liquid crystal orientation and different tilt angles of liquid crystal molecules are spontaneously generated in each pixel of the liquid crystal layer 9, the polarization of light becomes remarkably nonuniform, so that a satisfactory effect cannot be expected.

Figure 4:
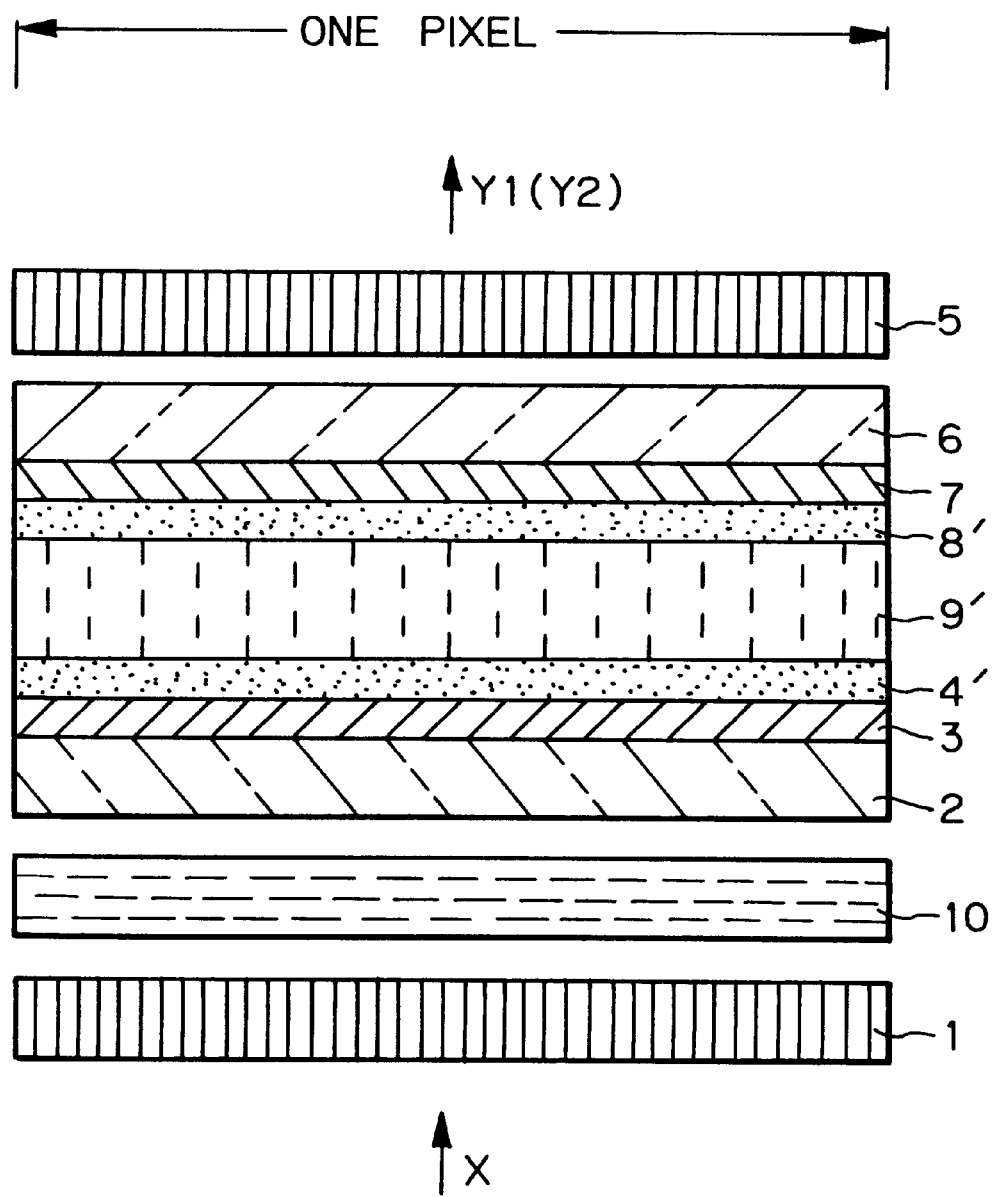
FIG. 4 is a cross-sectional view illustrating an embodiment of the TN-mode LCD apparatus according to the present invention.

In FIG. 4, which illustrates an embodiment of the present invention, a liquid crystal layer 9' is provided instead of the liquid crystal layer 9 of FIG. 3.

Figure 5:
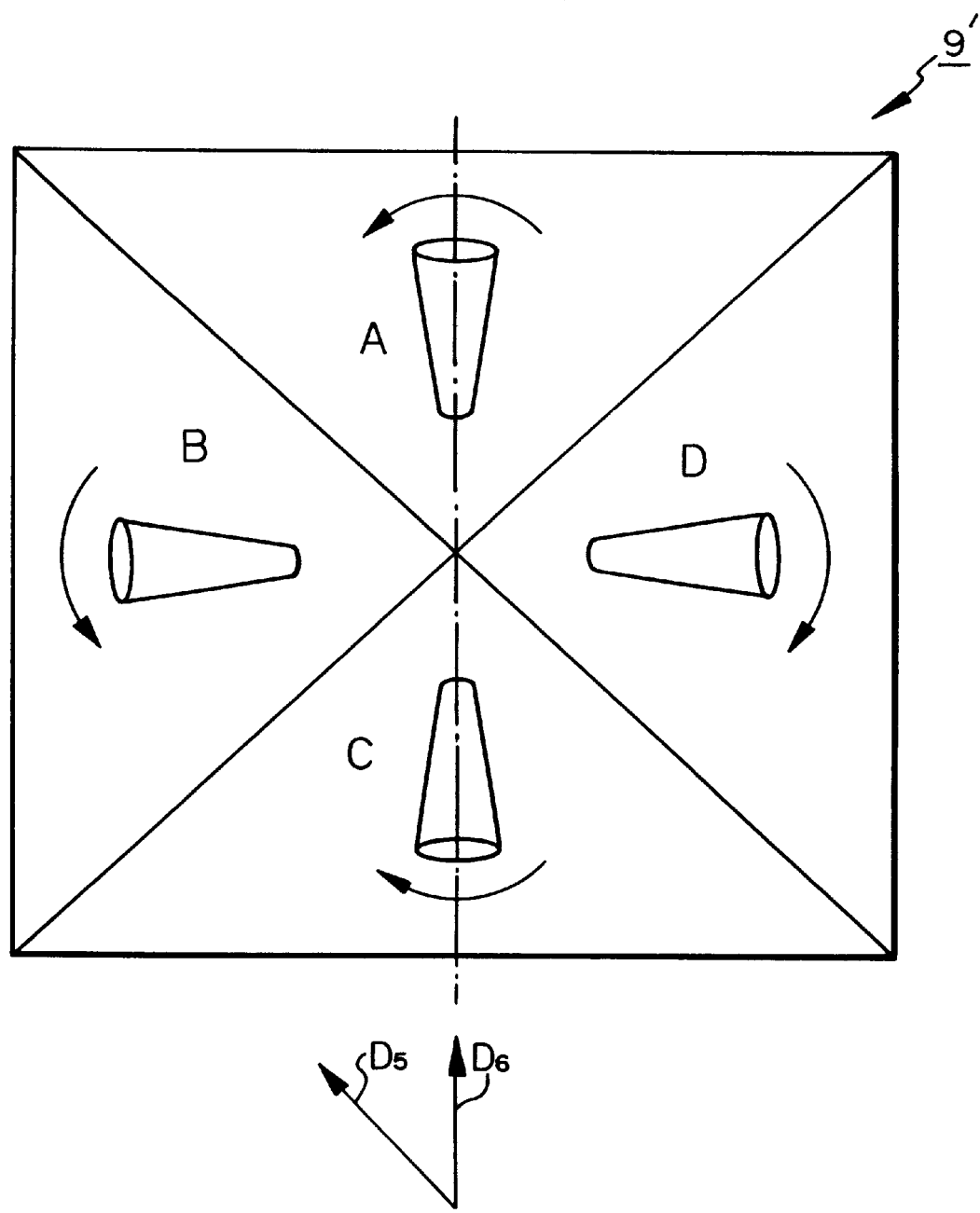
FIG. 5 is a plan view of the liquid crystal layer of FIG. 4.
Figure 6A:
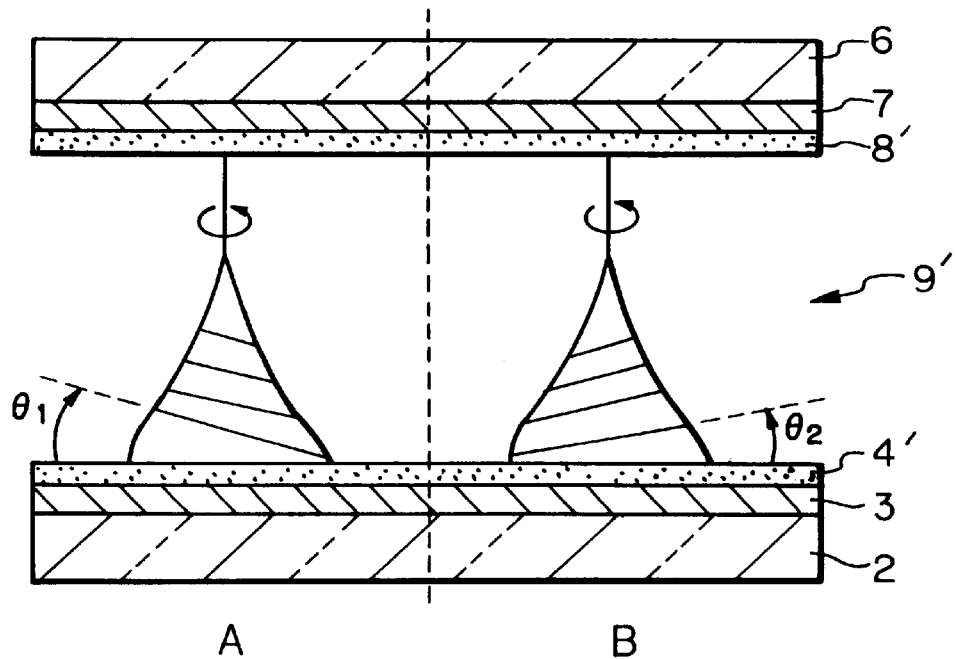
FIGS. 6A and 6B are cross-sectional views of the liquid crystal layer of FIG. 5.
Figure 6B:
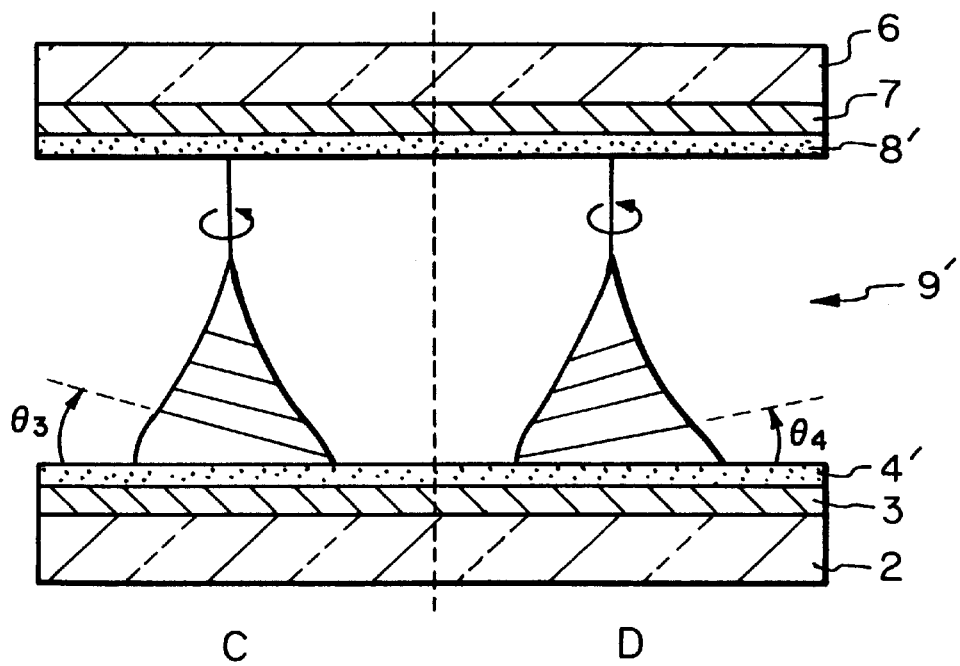

That is, as illustrated in FIG. 5, the liquid crystal layer 9' is divided into four regions A, B, C and D having different twisted directions of liquid crystal orientations and different directions of tilt angles of liquid crystal molecules in the form of a letter "X" within each pixel. For example, referring to FIGS. 6A and 6B, the region A has a right-hand twisted direction of liquid crystal orientation and a tilt angle $\theta_1$ of liquid crystal molecules, while the region B has a right hand twisted direction of liquid crystal orientation and a tilt angle $\theta_2$ of liquid crystal molecules. In this case, the direction of the tilt angle $\theta_1$ is opposite to that of the tilt angle $\theta_2$. Also, the region C has a left-hand twisted direction of liquid crystal orientation and a tilt angle $\theta_3$ of liquid crystal molecules, while the region D has a left hand twisted direction of liquid crystal orientation and a tilt angle $\theta_4$ of liquid crystal molecules. In this case, the direction of the tilt angle $\theta_3$ is opposite to that of the tilt angle $\theta_4$.

Figure 7:
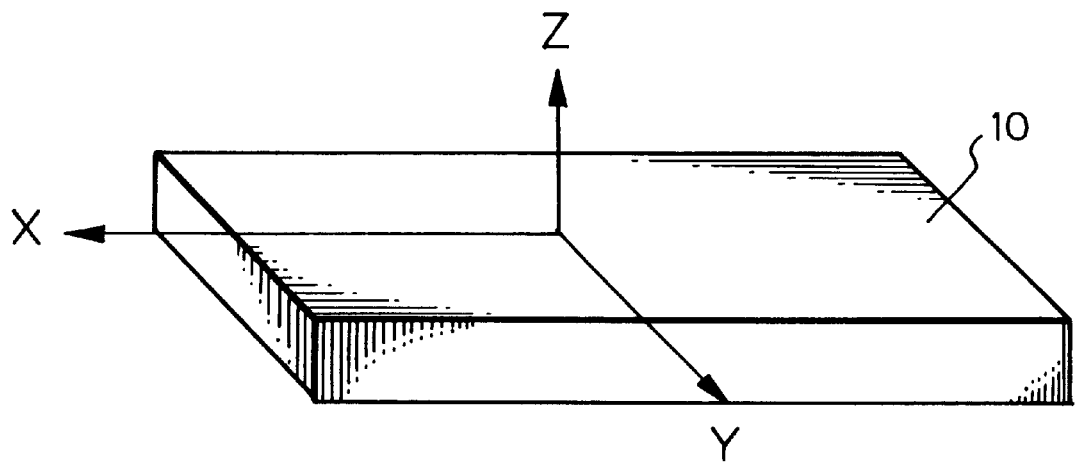
FIG. 7 is a perspective view for explaining the optical characteristics of the compensation layer of FIG. 4.
Figure 7:
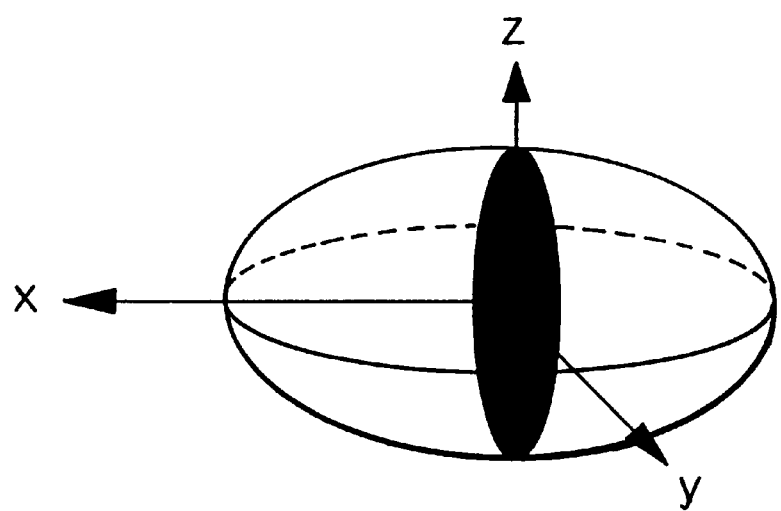

As illustrated in FIG. 7, the compensation layer 10 uses an ellipsoid of refractive index having a biaxial anisotropy of refractive index. More specifically, an x-axis and a y-axis are found within a plane of the compensation layer 10 and a z-axis extends perpendicularly from the plane of the compensation layer 10. The principal axes of the ellipsoid of refractive index are substantially and respectively parallel to the x-, y- and z-axes and not inclined relative to them. The refractive indices $n_x$, $n_y$ and $n_z$ along the x-, y-, z-axes show a relationship of $n_x > n_y > n_z$.

As will be described hereinafter, the compensation layer 10 satisfying the above defined requirement is effective for improving the visual angle of an LCD apparatus wherein regions with different twisted directions of liquid crystal orientation and different directions of tilt angles of liquid crystal molecules coexist in each pixel of the liquid crystal layer 9'.

Figure 8:
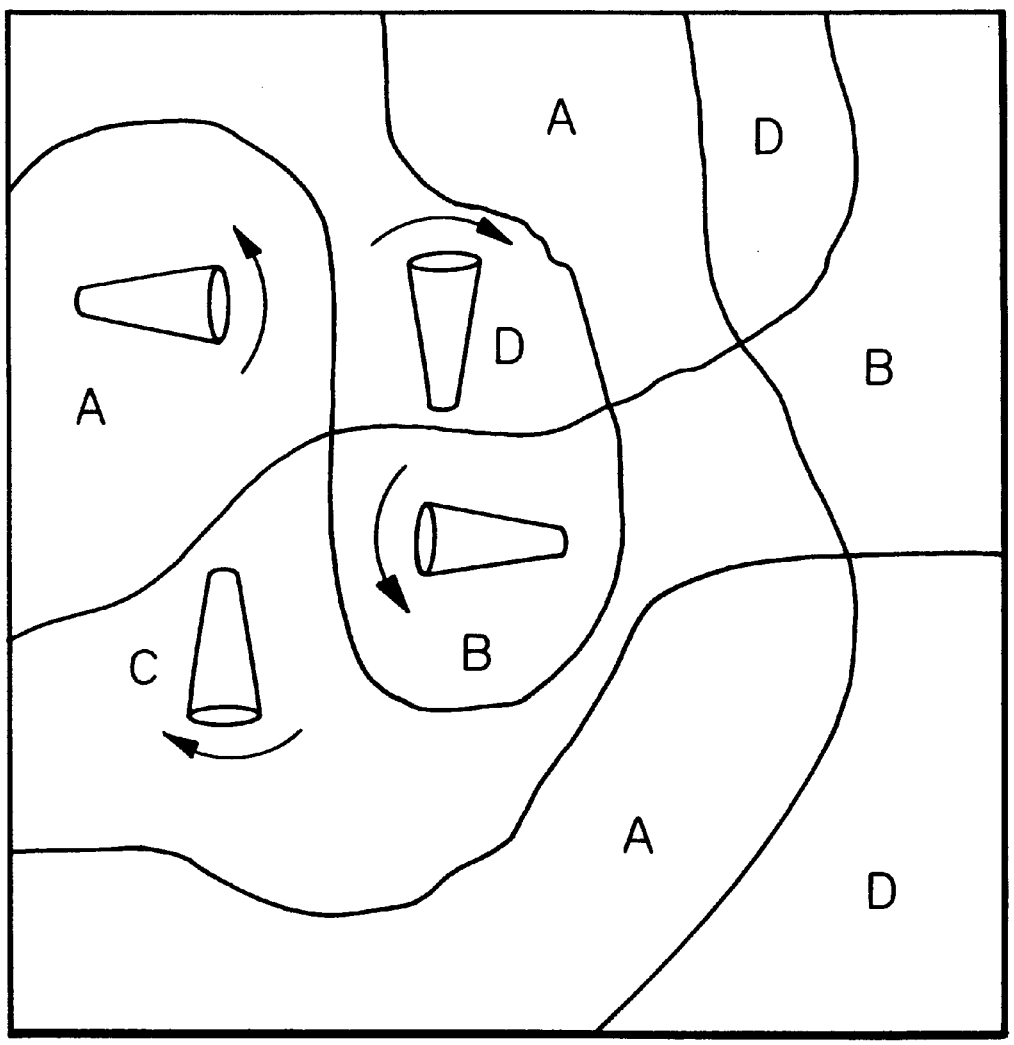
FIG. 8 is a plan view of another liquid crystal layer compared with the liquid crystal layer of FIG. 5.

As illustrated in FIG. 8, it is possible to produce regions with different twisted directions of liquid crystal orientation and different directions of tilt angles of liquid crystal molecules in each pixel without relying on the micro-rubbing technique and by using oriented layers having directions of tilt angles of liquid crystal molecules that are not uniformly limited and a liquid crystal material having twisted directions of liquid crystal orientation that are not uniformly limited either. In this case, the liquid crystal molecules in each minute region of the liquid crystal layer are aligned and show a tilt angle as a voltage is applied to the liquid crystal molecules to twist them but the tilt angle differs from region to region so that it is practically impossible to compensate for the twist on a region by region basis. Thus, if the compensation layer 10 has a single and unique inclination or twist as a whole, it may have a very effective compensation effect on some regions but a large "floating white effect" can arise in some other regions having a reversely directed tilt angle or twist to consequently reduce the contrast of the image displayed on the LCD apparatus as a whole. If, on the other hand, the compensation layer 10 does not have an inclined or twisted optical axis but operates optically uniformly within the entire plane, that is, the compensation layer 10 is a uniaxial compensation layer ($n_x = n_y$), it cannot effectively suppress the obliquely directed "floating white effect".

To the contrary, the compensation layer 10 of FIG. 4 has a biaxial refractivity anisotropy and each of the oriented layers 4' and 8' arranged on the respective transparent substrates 3 and 6 are rubbed in respective single directions that are different from each other so that, if the liquid crystal has an intraplanar anisotropy, an anisotropic arrangement that provides the best visual angle characteristics can be obtained by selecting the direction either parallel or perpendicular to the rubbing direction. Additionally, since four regions A through D having respective twisted directions of liquid crystal orientation and directions of tilt angles of liquid crystal that are different from each other are arranged diagonally and have the same area in each pixel in a manner as described above, the visual angle dependency is compensated for to provide wide visual angle characteristics that are free from the impression of a coarse display surface.

The method of manufacturing the apparatus of FIG. 4 is explained next.

First, a transparent substrate 2 having a transparent electrode (counter electrode) 3 on the entire surface and a transparent substrate 6 having a large number of transparent electrodes (pixel electrode) 7 each having a size of 100 $\mu m \times 100 \mu m$ at regular intervals of 10 $\mu m$ are prepared. Note that the transparent electrode 3 has a large number of "X"-shaped openings with a width of 5 $\mu m$ as illustrated in FIG. 5.

Next, the transparent substrates 2 and 6 with the transparent electrodes 3 and 7 are cleansed. Then, oriented layers 4' and 8' are spin-coated by applying a polyimide orientation agent JALS-428 available from Japan Synthetic Rubber on the transparent electrodes 3 and 7. Then, the oriented layers 4' and 8' are baked at 90° C. and 220° C.

Next, the oriented layers 4' and 8' are subjected to a rubbing process using a piece of buffing cloth made of rayon. In this case, the oriented layers 4' and 8' are rubbed diagonally relative to the transparent substrates 2 and 6 to show an angle of 90° between the two rubbing directions.

Next, adhesive layers are coated on the peripheries of the oriented layers 4' and 8', and then, latex balls having a diameter of 6 $\mu m$ are sprinkled as spacers on the adhesive layers.

Then the transparent substrates 2 and 6 are bonded together under pressure in such a manner that the openings of the transparent electrode 3 are located at the centers of the respective transparent electrodes 7.

Next, the bonded transparent substrates 2 and 6 are placed in a vacuum tank which is then evacuated. Thereafter, a liquid crystal solution containing nematic liquid crystal ZL14792 available from Merk, whose phase transition temperature is 92° C., ultraviolet-rays-set monomer KAYARAD PET-30 available from Nippon Kayaku and an initiator Irganox 907 which is 5 wt % relative to the monomer is injected into the gap between the transparent substrates 2 and 6, to produce a liquid crystal layer 9'. The obtained panel is heated to 110° C. and irradiated with ultraviolet rays at 0.1 mW/cm$^2$ for 30 minutes at that temperature. Subsequently, the transparent substrates 2 and 6 are cooled at a rate of 20° C./min. while a sinusoidal wave voltage of 8V and 10 Hz is being applied thereto. When the obtained liquid crystal cell was observed through a polarizing microscope, each pixel had been divided into four minute regions by the X-shaped openings. It was also confirmed from the change in the brightness observed when the cells were tilted that the four minute regions A through D had tilt directions as illustrated in FIG. 5.

On the other hand, if a biaxially anisotropic film New-VAC-200/240 Film available from Sumitomo Chemical is used as a compensation layer 10, in this case, the intraplanar retardation $((n_x-n_y) \times d, d:thickness)$ and the retardation perpendicular to the plane of the $((n_x+n_y)/2-n_z) \times d)$ are 200 nm and 240 nm, respectively.

Next, a polarization plate 1, the compensation layer 10, the obtained crystal liquid cells, and a polarization plate 5 are superposed in this order, so that the optical transmission axes of the polarization plates 1 and 5 are fixed in the rubbing directions of the transparent substrates 2 and 6 of the liquid crystal cells.

Next, the direction of the compensation layer 10 is changed while a voltage is being applied to show a "black" screen. As a result, the "floating white effect" is remarkably suppressed for the largest angle of inclination when the transmission axis of the polarization plate 1 and the $n_x$-axis of the compensation layer 10 cross each other perpendicularly.

Finally, the compensation layer 10 is rigidly fixed under the above-described condition.

According to the inventor's evaluation using a liquid crystal evaluation apparatus LCD-5000, since the liquid crystal layer 9' is quadrisymmetric, the same visual angle dependency was observed for every 90°. Also, as illustrated in FIGS. 9A and 9B, the visual angle dependency of light transmitance at 0° and 45° from the transmission axis of the polarization plates 1 and 5 can be improved.

Also, when the compensation layer 10 was a biaxially anisotropic film whose intraplanar retardation and retardation perpendicular to the plane of the film were 100 nm and 125 nm respectively, it was observed that the "floating white effect" was remarkably suppressed for the largest angle of inclination when the transmission axis of the polarization plate 1 and the $n_x$-axis of the compensation layer 10 crossed each other perpendicularly.

Figure 10A:
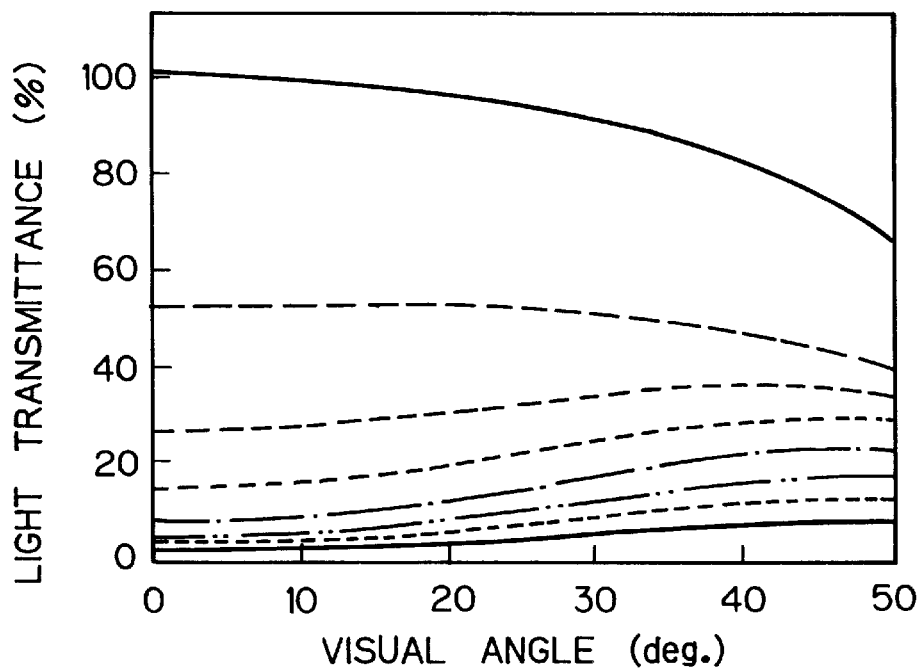
FIGS. 10A and 10B are graphs for showing other visual angle dependency compared with that of FIGS. 9A and 9B.
Figure 10B:
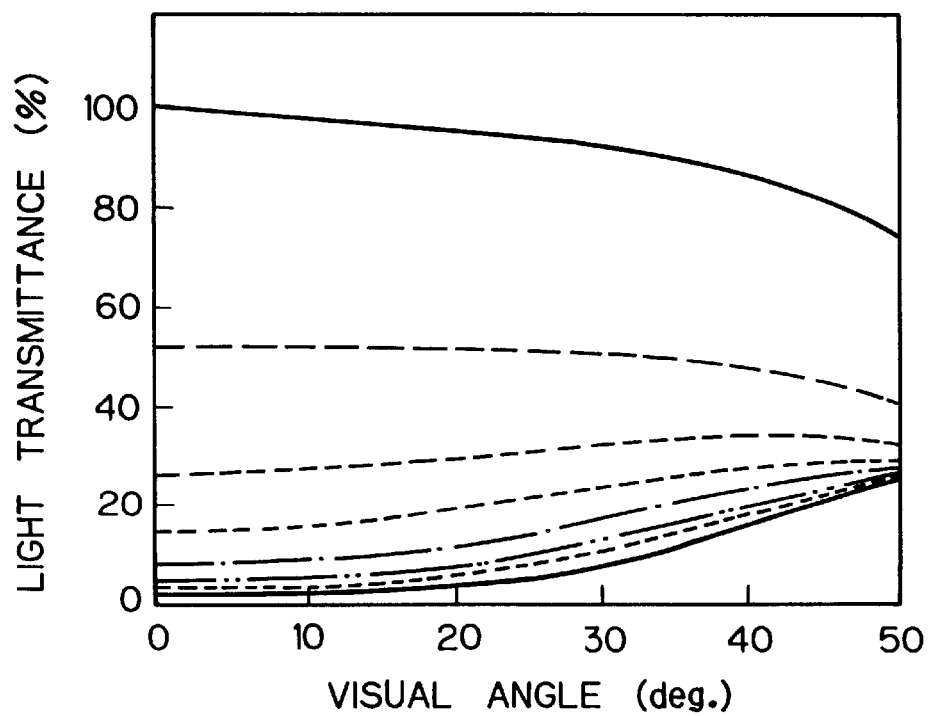

Note that, if the compensation layer 10 is not provided in FIG. 4, the visual angle dependency of light transmissitance was observed as shown in FIGS. 10A and 10B.

Figure 9A:
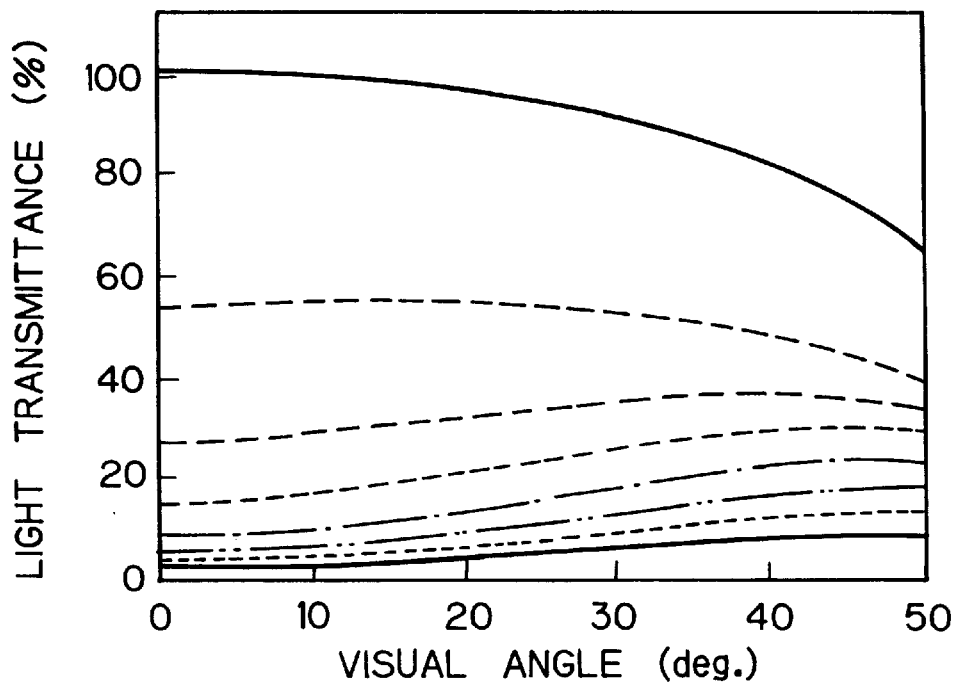
FIGS. 9A and 9B are graphs for showing the visual angle dependency of the apparatus of FIG. 4.
Figure 9B:
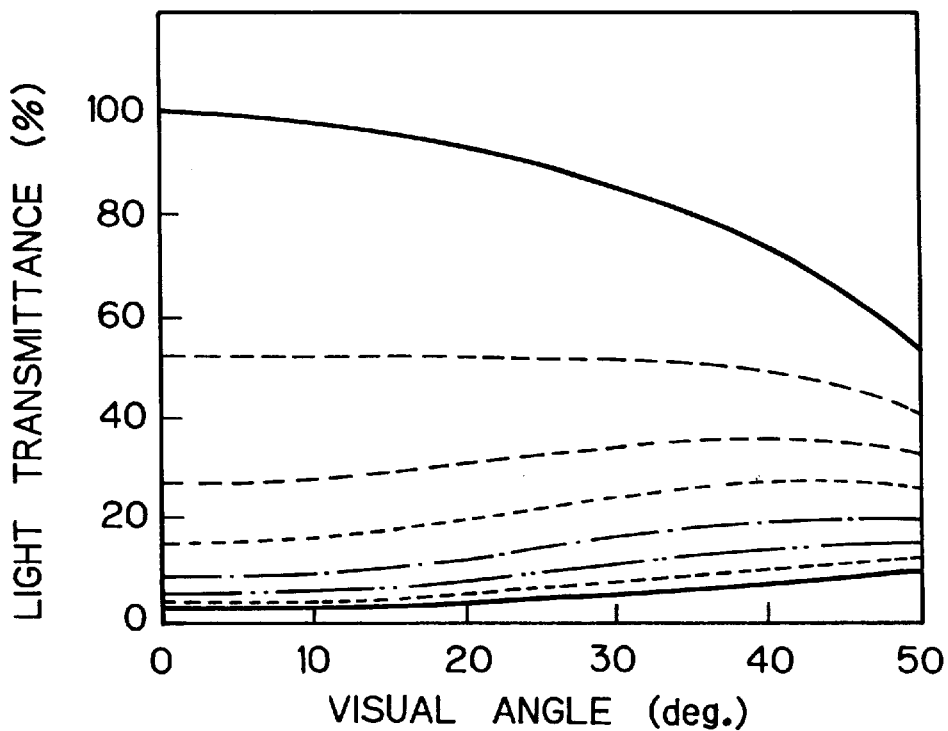

Note that FIGS. 9A and 10A show the light transmittance characteristics along a rubbing direction which corresponds to a direction as indicated by $D_5$ in FIG. 5 and FIGS., 9B and 10B show the light transmittance characteristics along a 45° direction to the rubbing direction which corresponds to a direction indicated by $D_6$ in FIG. 5.

By comparing FIG. 9B and FIG. 10B, it was found that the "floating white effect" at the angle of 45° was remarkably suppressed in the embodiment of the present invention. Further, when the compensation layer 10 was a biaxially anisotropic film whose intraplanar retardation and retardation perpendicular to the plane of the film were 150 nm and 185 nm respectively, it was observed that the "floating white effect" was remarkably suppressed for the largest angle of inclination when the transmission axis of the polarization plate 1 and the $n_x$-axis of the compensation layer 10 crossed each other perpendicularly. The effect was more remarkable in the latter case.

Figure 11:
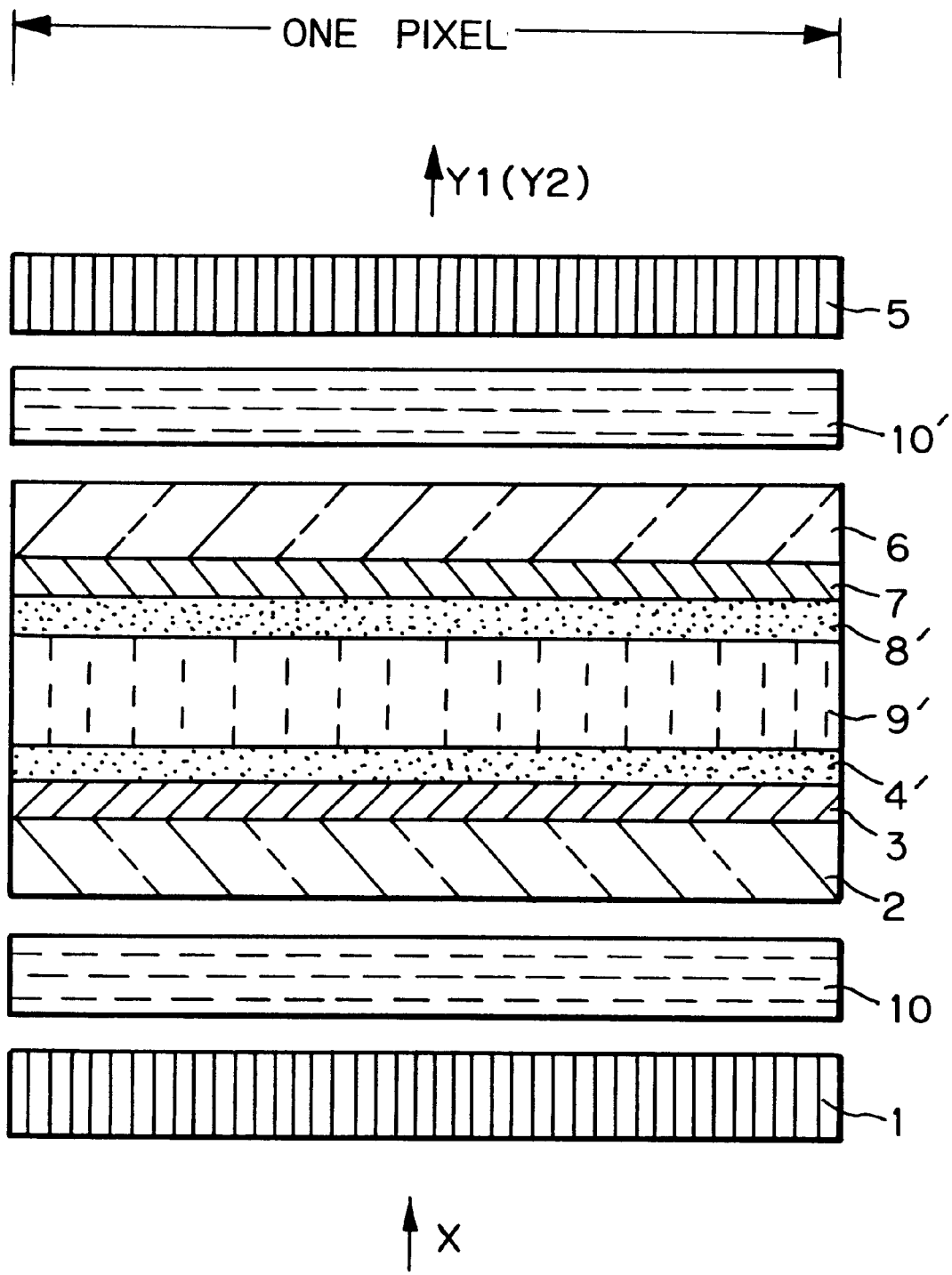
FIGS. 11, 12 and 13 are cross-sectional views illustrating modifications of the apparatus of FIG. 4.
Figure 12:
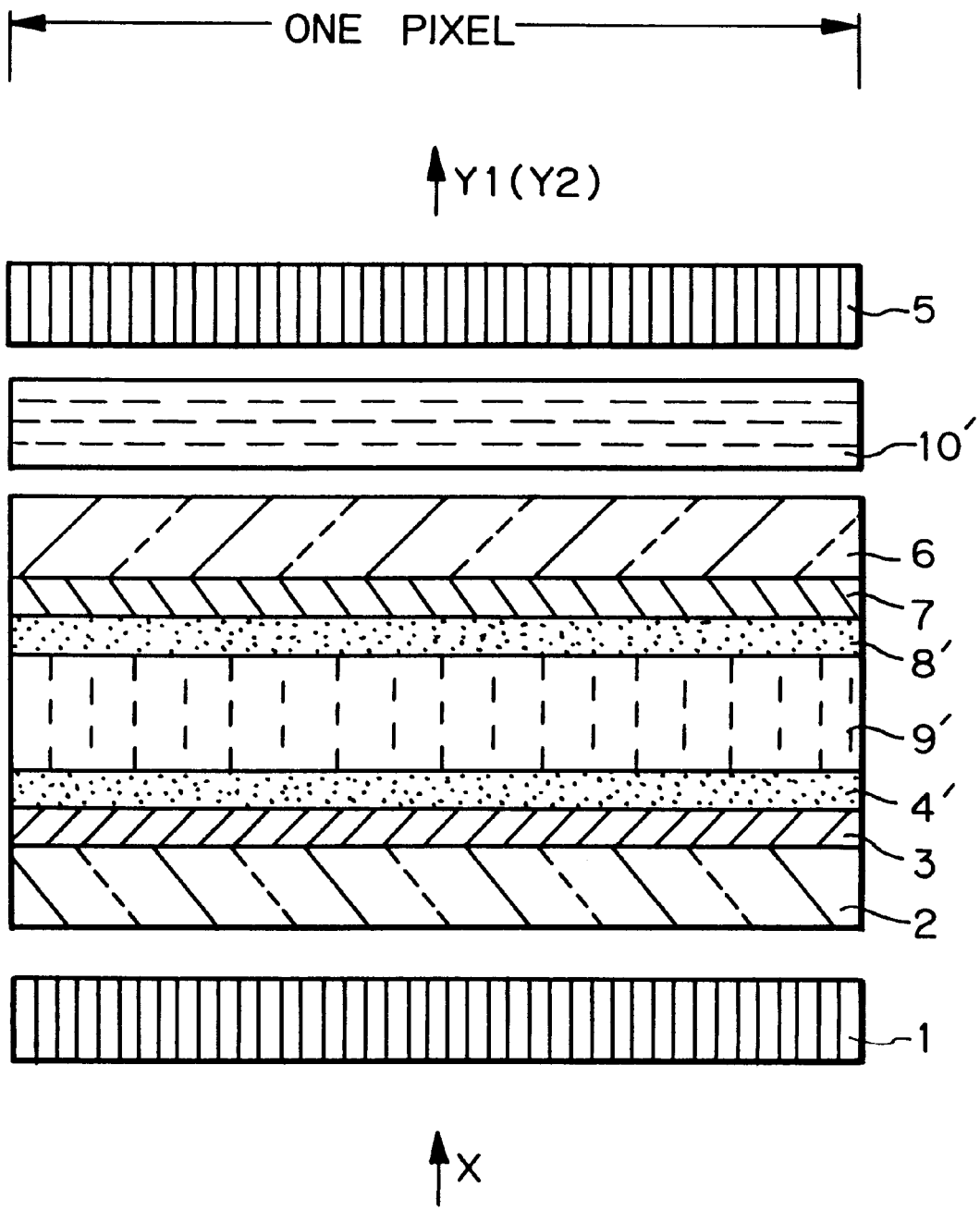

Althought the compensation layer 10 is interposed between the polarization plate 1 and the transparent substrate 2 in the above described embodiment, another compensation layer 10' can also be interposed between the polarization plate 5 and the transparent substrate 6 as illustrated in FIG. 11, Further, only the compensation layer 10' can be provided as illustrated in FIG. 12.

Figure 13:
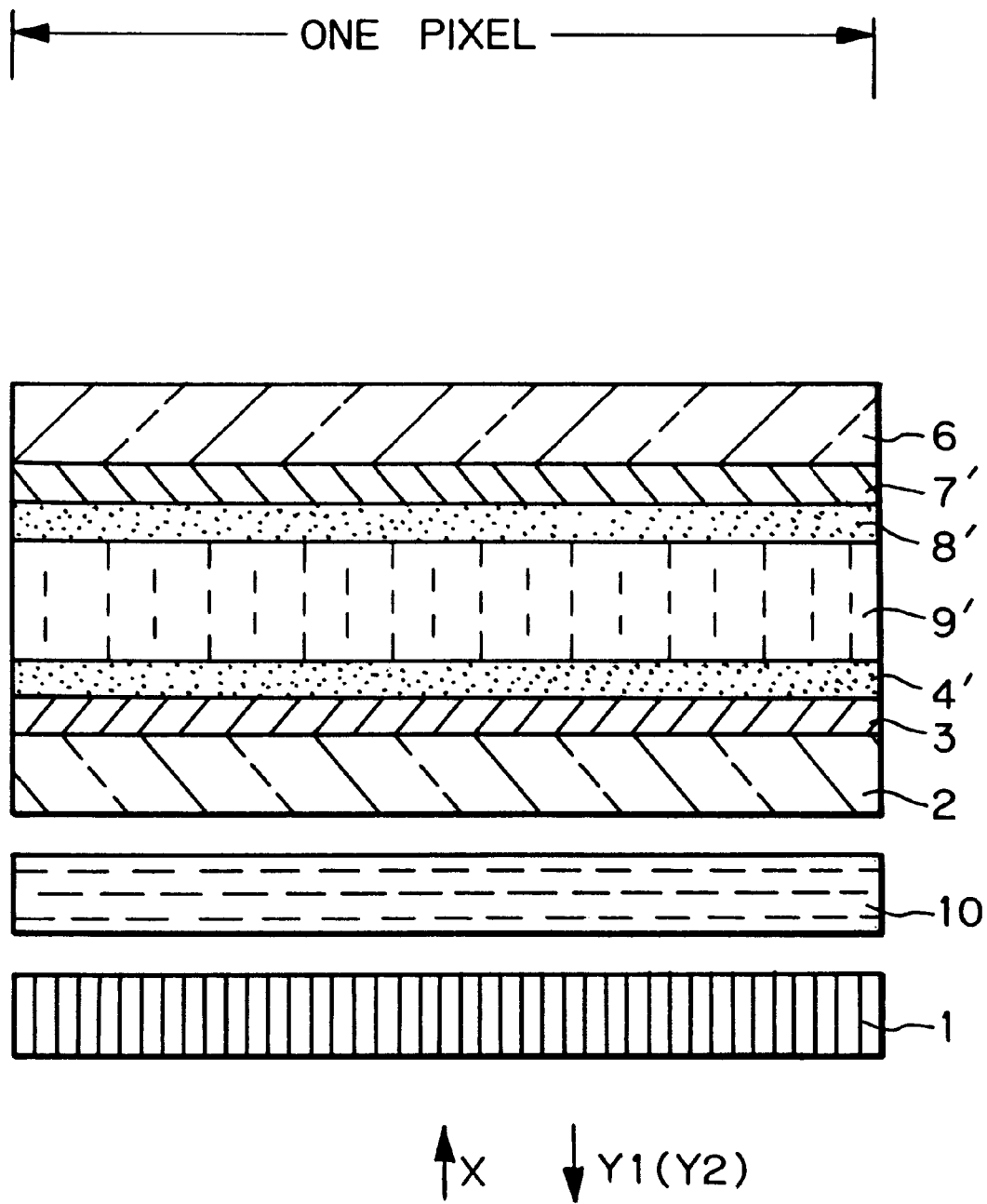

In FIG. 13, the apparatus of FIG. 4 is applied to a reflection-type TN-mode LCD apparatus, which does not require a backlight. That is, a reflective electrode 7' made of aluminum or the like is provided instead of the transparent electrode 7 of FIG. 4. In this case, the polarization plate 5 of FIG. 4 is not provided, and the transparent substrate 6 can be opaque, i.e., made of metal, polymer or ceramic.

As explained hereinabove, according to the present invention, the LCD apparatus includes a liquid crystal layer having coexistent regions with different twisted directions of liquid crystal orientations and different tilt angles of liquid crystal molecules and a compensation layer having a biaxially refractive anisotropy and arranged between the liquid crystal layer and the corresponding one of a pair of polarization plates sandwiching the liquid crystal layer, an anisotropic arrangement that provides the best visual angle characteristics can be obtained by appropriately selecting the direction either parallel or perpendicular to the rubbing direction so that the display apparatus provides a large visual angle and an enhanced contrast because there occurs no tone inversion nor the phenomenon of so-called "floating white". Additionally, if four regions having respective twisted directions and directions of liquid crystal molecules that are different from each other are diagonally arranged to have the same surface area in each pixel, the visual angle dependency of the apparatus is compensated for to provide a wide visual angle that is free from the impression of a coarse display surface.

What is claimed is:

1. A liquid crystal display apparatus comprising:

first and second polarization plates;

first and second transparent substrates provided between said first and second polarization plates;

first and second transparent electrodes provided between said first and second transparent substrates;

first and second oriented layers coated on inner surfaces of said first and second transparent electrodes;

a twisted-mode type liquid crystal layer having coexistent regions with different twisted directions of liquid crystal orientations and different tilt angles of liquid crystal molecules within one pixel, said liquid crystal layer being provided between said first and second transparent electrodes; and a compensation layer having biaxial refractive anisotropy interposed between said first polarization plate and said first transparent electrode.

2. The apparatus as set forth in claim 1, wherein said compensation layer has the following characteristics:

$n_x > n_y > n_z$ where $n_x$ is a refractive index of said compensation layer along an X-axis in a plane of said compensation layer;

$n_y$ is a refractive index of said compensation layer along a Y-axis in the plane of said compensation layer perpendicular to said X-axis; and $n_z$ is a refractive index along a Z-axis perpendicular to the plane of said compensation layer.

3. The apparatus as set forth in claim 1, wherein a number of said coexistent regions within said pixel is 4.

4. A liquid crystal display apparatus comprising:

first and second polarization plates;

first and second transparent substrates provided between said first and second polarization plates;

first and second transparent electrodes provided between said first and second transparent substrates;

first and second oriented layers coated on inner surfaces of said first and second transparent electrodes;

a twisted-mode type liquid crystal layer having coexistent regions with different twisted directions of liquid crystal orientations and different tilt angles of liquid crystal molecules within one pixel, said liquid crystal layer being provided between said first and second transparent electrodes;

a first compensation layer, having biaxial refractive anisotropy, interposed between said first polarization plate and said first transparent electrode; and a second compensation layer having biaxial refractive anisotropy interposed between said second polarization plate and said second transparent electrode.

5. The apparatus as set forth in claim 4, wherein each of said first and second compensation layers has the following characteristics:

$n_x > n_y > n_z$ where $n_x$ is a refractive index of each of said first and second compensation layers along an X-axis in a plane of each of said first and second compensation layers;

$n_y$ is a refractive index of each of said first and second compensation layers along a Y-axis in the plane of each of said first and second compensation layers perpendicular to said X-axis; and $n_z$ is a refractive index along a Z-axis perpendicular to the plane of each of said first and second compensation layers.

6. The apparatus as set forth in claim 4, wherein a number of said coexistent regions within said pixel is 4.

7. A liquid crystal display apparatus comprising:

first and second polarization plates;

first and second transparent substrates provided between said first and second polarization plates;

first and second transparent electrodes provided between said first and second transparent substrates;

first and second oriented layers coated on inner surfaces of said first and second transparent electrodes;

a twisted-mode type liquid crystal layer having coexistent regions with different twisted directions of liquid crystal orientations and different tilt angles of liquid crystal molecules within one pixel, said liquid crystal layer being provided between said first and second transparent electrodes; and a compensation layer having biaxial refractive anisotropy interposed between said second polarization plate and said second transparent electrode.

8. The apparatus as set forth in claim 7, wherein said compensation layer has the following characteristics:

$n_x > n_y > n_z$ where $n_x$ is a refractive index of said compensation layer along an X-axis in a plane of said compensation layer;

$n_y$ is a refractive index of said compensation layer along a Y-axis in the plane of said compensation layer perpendicular to said X-axis; and $n_z$ is a refractive index along a Z-axis perpendicular to the plane of said compensation layer.

9. The apparatus as set forth in claim 7, wherein a number of said coexistent regions within said pixel is 4.

10. A liquid crystal display apparatus comprising:

a polarization plate;

first and second substrates on an inner side of said polarization plate, said first substrate being transparent;

first and second electrodes provided between said first and second transparent substrates, said first electrode being transparent, said second electrode being of a reflection type, first and second oriented layers coated on inner surfaces of said first and second electrodes;

a twisted-mode type liquid crystal layer having coexistent regions with different twisted directions of liquid crystal orientations and different tilt angles of liquid crystal molecules within one pixel, said liquid crystal layer being provided between said first and second electrodes; and a compensation layer having biaxial refractive anisotropy interposed between said first polarization plate and said first electrode.

11. The apparatus as set forth in claim 10, wherein said compensation layer has the following characteristics:

$n_x > n_y > n_z$ where $n_x$ is a refractive index of said compensation layer along an X-axis in a plane of said compensation layer;

$n_y$ is a refractive index of said compensation layer along a Y-axis in the plane of said compensation layer perpendicular to said X-axis; and $n_z$ is a refractive index along a Z-axis perpendicular to the plane of said compensation layer.

12. The apparatus as set forth in claim 10, wherein a number of said coexistent regions within said pixel is 4.

* * * * *